United States Patent
Wu et al.

(10) Patent No.: US 8,479,300 B2
(45) Date of Patent: Jul. 2, 2013

(54) METHOD FOR TRANSMITTING DATA AND PREVENTING UNAUTHORIZED DATA DUPLICATION FOR HUMAN-MACHINE INTERFACE DEVICE USING MASS STORAGE CLASS OPERATING ON UNIVERSAL SERIAL BUS

(75) Inventors: Ching-Yang Wu, Taoyuan County (TW); Chia-Feng Lee, Taoyuan County (TW); Sheng-Chou Lin, Taoyuan County (TW)

(73) Assignee: Delta Electronics, Inc., Taoyuan Shien (TW)

( * ) Notice: Subject to any disclaimer, the term of this patent is extended or adjusted under 35 U.S.C. 154(b) by 744 days.

(21) Appl. No.: 12/605,560

(22) Filed: Oct. 26, 2009

(65) Prior Publication Data

US 2011/0099383 A1    Apr. 28, 2011

(51) Int. Cl.
*G06F 12/14*    (2006.01)

(52) U.S. Cl.
USPC ............................. 726/27; 726/26; 713/189

(58) Field of Classification Search
USPC .................. 726/26, 27, 29, 30; 713/183, 189
See application file for complete search history.

(56) References Cited

U.S. PATENT DOCUMENTS

| | | | | |
|---|---|---|---|---|
| 5,661,800 A * | 8/1997 | Nakashima et al. | ............ | 726/27 |
| 7,380,140 B1 * | 5/2008 | Weissman et al. | ............ | 713/193 |
| 7,392,398 B1 * | 6/2008 | Shakkarwar | ................. | 713/189 |
| 7,486,791 B2 * | 2/2009 | Ohbi et al. | ..................... | 380/201 |
| 8,302,178 B2 * | 10/2012 | Camiel | ........................... | 726/11 |
| 2002/0026580 A1 * | 2/2002 | Igari | ............................. | 713/168 |
| 2004/0054836 A1 * | 3/2004 | Lai et al. | ....................... | 710/305 |
| 2004/0091114 A1 * | 5/2004 | Carter et al. | ................... | 380/259 |
| 2005/0222961 A1 * | 10/2005 | Staib et al. | ...................... | 705/64 |
| 2007/0106612 A1 * | 5/2007 | O'Brien et al. | ................. | 705/44 |
| 2007/0248029 A1 * | 10/2007 | Merkey et al. | ................ | 370/255 |
| 2008/0141029 A1 * | 6/2008 | Culver | .......................... | 713/165 |
| 2008/0195797 A1 * | 8/2008 | Sherman et al. | ............. | 711/103 |
| 2010/0153673 A1 * | 6/2010 | Shen et al. | ..................... | 711/165 |

FOREIGN PATENT DOCUMENTS

| | | |
|---|---|---|
| JP | 11-031127 | 2/1999 |
| JP | 2009-104327 | 5/2009 |

* cited by examiner

*Primary Examiner* — Linglan Edwards
(74) *Attorney, Agent, or Firm* — Muncy, Geissler, Olds & Lowe, PLLC (57) ABSTRACT

A method for transmitting data and preventing unauthorized data duplication for human-machine interface device (HID) using Mass Storage Class (MSC) operating on Universal Serial Bus (USB) simulating the HID as an external USB storage device to make data connection to an external computer thus driver installation is not required when the operating system used by the external computer is not compatible with the operating used by the HID. The method encrypted the transmitted data via a dynamic password and does not write the data to the File Allocation Table (FAT) therefore the transmitted data is not under threat of unauthorized data duplication by a third party.

13 Claims, 7 Drawing Sheets

METHOD FOR TRANSMITTING DATA AND PREVENTING UNAUTHORIZED DATA DUPLICATION FOR HUMAN-MACHINE INTERFACE DEVICE USING MASS STORAGE CLASS OPERATING ON UNIVERSAL SERIAL BUS

BACKGROUND OF THE INVENTION

Field of the Invention

The present invention generally relates to a human-machine interface device (HID), in particular, to a method for preventing unauthorized data duplication from a human-machine interface device.

A device using a Human Machine Interface (HMI) or a Human-machine Interface Device (HID) is a communicating interface between users and a machine for message exchange, communication and interactions. Users input instructions via control buttons or touch control icons of the HID to trigger corresponding actions according to the instructions input to offer a user-friendly method for machine control. More to that, HID has gradually replaced the traditional control panel used in industrial automation control which required complicated wiring in prior art due to its convenience.

Figure 1:
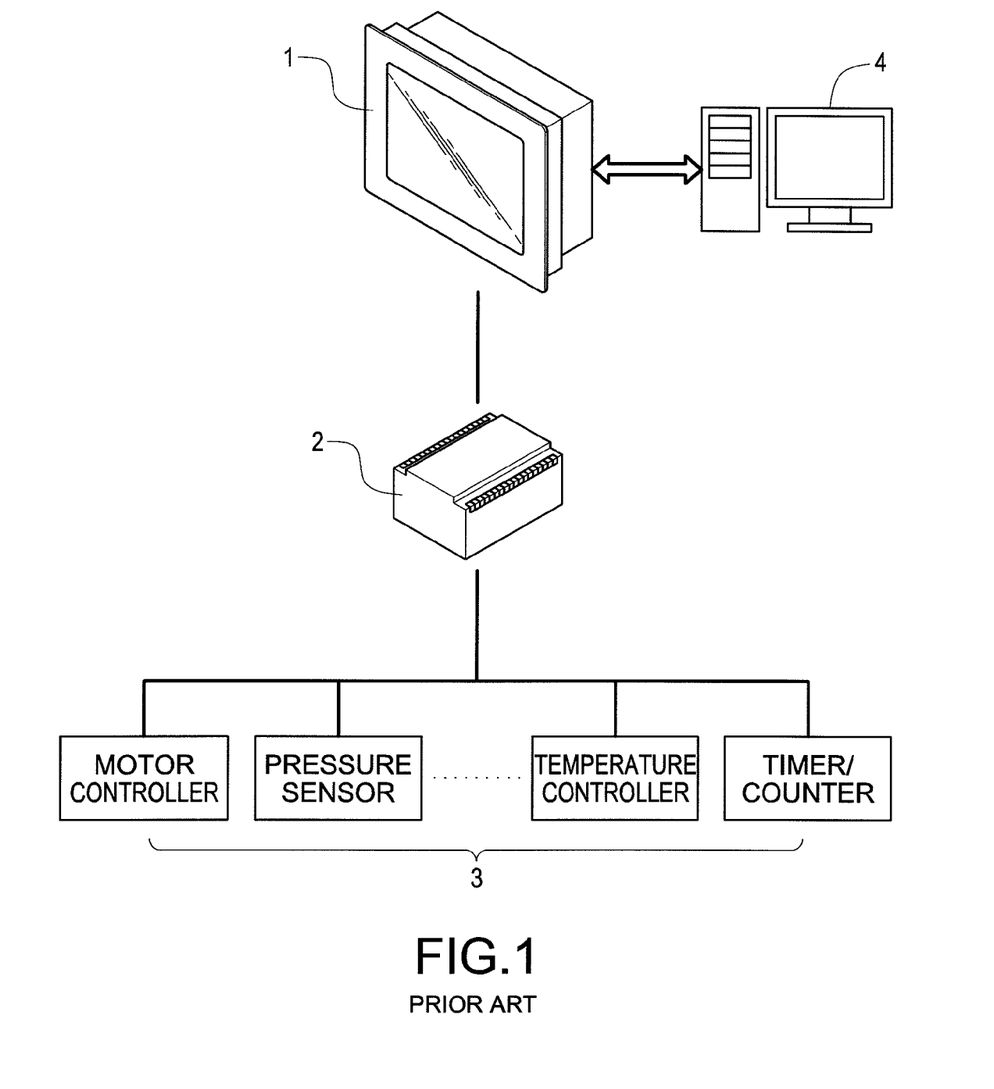
FIG. 1 is a schematic diagram illustrating the configuration of a HID.

As shown in FIG. 1, a HID 1 is connected to a Programmable Logic Controller (PLC) 2 and issue control instruction to a plurality of external machines via the PLC 2 and receives return working data from the machines 3. Currently, HIDs 1 available in the market are interfaced to an external touch control Liquid Crystal Display (LCD) via an internal control application to allow users issue control instructions to machines 3 by simple touch control actions and receive corresponding working data. To keep up with the technology developments, when new versions of technology associated with the HID control are launched, it is required to perform regular application updates to assure optimal operation of a HID 1. Further, it is also required to regularly upload the working data received by a HID 1 as record archive for user reference.

However, as shown in FIG. 1, the HID 1 is connected to an external computer 4 for performing data download or upload. In addition, users have to install drivers developed by the manufacturer of the HID 1 in the external computer 4. Yet with the rapid progress of information technology, various Operating Systems (OS) are introduced and updates of each OS are launched by shorten cycles. Frequently, the OS used by HID 1 is not compatible with the OS used by the computer 4, which results in connection errors due to driver support between the HID 1 and the computer 4. The data transmission between the HID 1 and the computer 4 cannot be established. As a result, the manufacturers are required to develop various drivers to support different OS which is time and cost consuming process.

In addition to the above connection method, part of the HID products in the market support using an external USB Flash Disk (UFD) as the data transmission interface for exchanging data between a HID and a computer. Considering various viruses are running rampant on networks, users now are raising their concerns of potential loss because when using UFD as the data transmission interface critical data is under threats of virus attacks and high risk of data theft by hackers during the data transmission.

In order to address the above disadvantages, it is indispensable to offer a innovative means for data transmission in the market to overcome the driver support issue caused by the OS compatibility and to assure critical data is not under high risk of data theft which may lead to massive loss of developers.

SUMMARY OF THE INVENTION

The invention is mainly to provide a method for transmitting data and preventing unauthorized data duplication for human-machine interface device (HID) using Mass Storage Class (MSC) operating on Universal Serial Bus (USB). The method uses MSC in data connection between a HID and an external computer and does not need to install HID drivers on the external computer. The set of protocols in MSC offer security mechanism during data transmission between the HID and the computer such that the data is not under threats of data theft by a third party.

In order to realized the above target, the present invention simulating the HID as an external USB storage device establishing data connection to the external computer based on MSC. Thus it is not required to install corresponding drivers in the external computer when the OS used by external computer is not compatible with the OS used by the HID. The data is encrypted by a dynamic password during transmission and is not written to the File Allocation Table (FAT).

The advantage provided by the method of the present invention is users are free from driver support issues caused by OS compatibility when establish data connection between the HID and the external computer and the data transmission is free from the risk of data theft by a third party.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment.

Figure 2A:
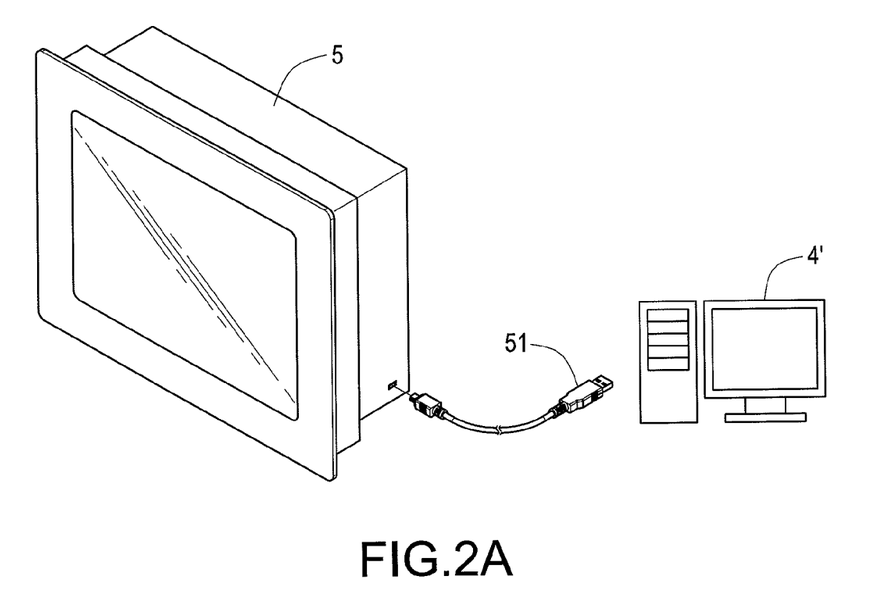
FIG. 2A is a schematic diagram illustrating the transmission connection of a HID.
Figure 2B:
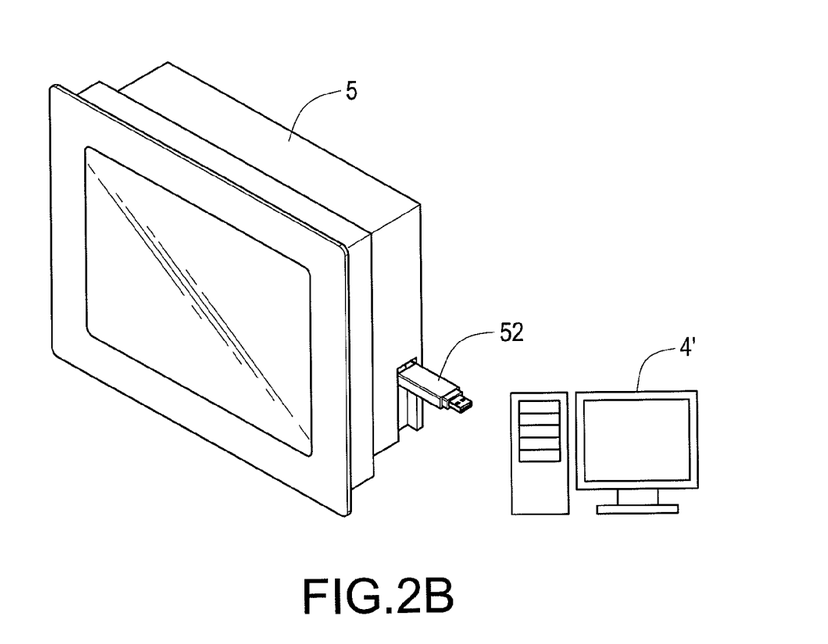
FIG. 2B is the other schematic diagram illustrating the transmission connection of a HID.

FIG. 2A and FIG. 2B are schematic diagrams illustrating the transmission connection of a HID. As shown in the diagram, a Human-machine Interface Device (HID) 5 connects to an external computer 4' via Universal Serial Bus (USB) connect ports 51, 52 according to the present invention. The present invention utilizes USB Mass Storage Class (MSC) defines the HID 5 to simulate the HID 5 as an external USB storage device 5' (for example the external drive shown in FIG. 3). Thus, the HID 5 has plug and play capability by implementing USB MSC. The computer 4' is allowed to connect to the HID 5 any time without installing proprietary drivers developed by manufactures of the HID 5.

When the HID 5 is connected to the computer 4', the computer 4' issues an inquiry instruction inquiring the identity of the newly connected device. In response, the HID 5 replies according to USB MSC to the computer 4'. It is known by people skilled in the art that the reply includes a general structure of a File System (F/S) of a drive using MSC, for example Master Boot Record (MBR) and File Allocation Table (FAT). The computer 4' receives the reply, identifies the connected HID 5 as a USB storage device 5' using MSC, and assigns a drive serial no to the HID 5 for example "D:\" or "E:\". Yet, the HID 5 according to the present invention is pre-configured in factory to use a data transmit application 41 (a proprietary data transmit application 41 developed by the manufacturer) installed in the computer 4' when the HID 5 is connected to the computer 4' for data transmission (such as HID updates or HID working records files). In other words, the application 41 is the only application configured to gain access to the HID 5 for transmitting data related to the HID 5 or other data.

Figure 3:
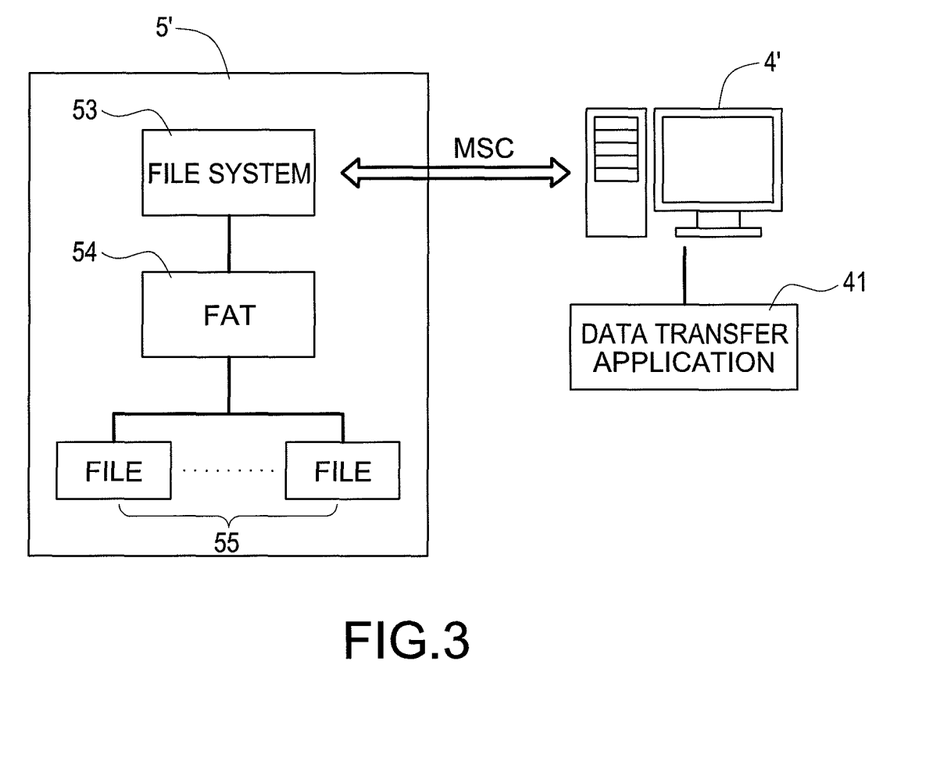
FIG. 3 is a schematic diagram illustrating the configuration of a storage device using mass storage class.

As shown in FIG. 3, the computer 4' identifies the HID 5 of the present invention as an external storage device 5'. The storage device 5' matches the file names saved in the storage device 5' to a specific FAT 54 according to a file system 53. Then the storage device 5' matches the content of the FAT 54 to a physical address of the storage device 5' where the files 55 are saved such that the computer 4' may proceed to operations such as add, edit, and delete. A user acknowledges the content saved in the storage device 5' on the computer 4' because the FAT 54 provides a matching means. A user cannot acknowledge the files 55 which are saved in the storage device 5' without referencing by matching record in the FAT 54. Thus the files 55 are not shown on the computer 4'. The present invention provides a protection mechanism on data transmission via implementing MSC. The mechanism is detailed in the following.

Figure 4:
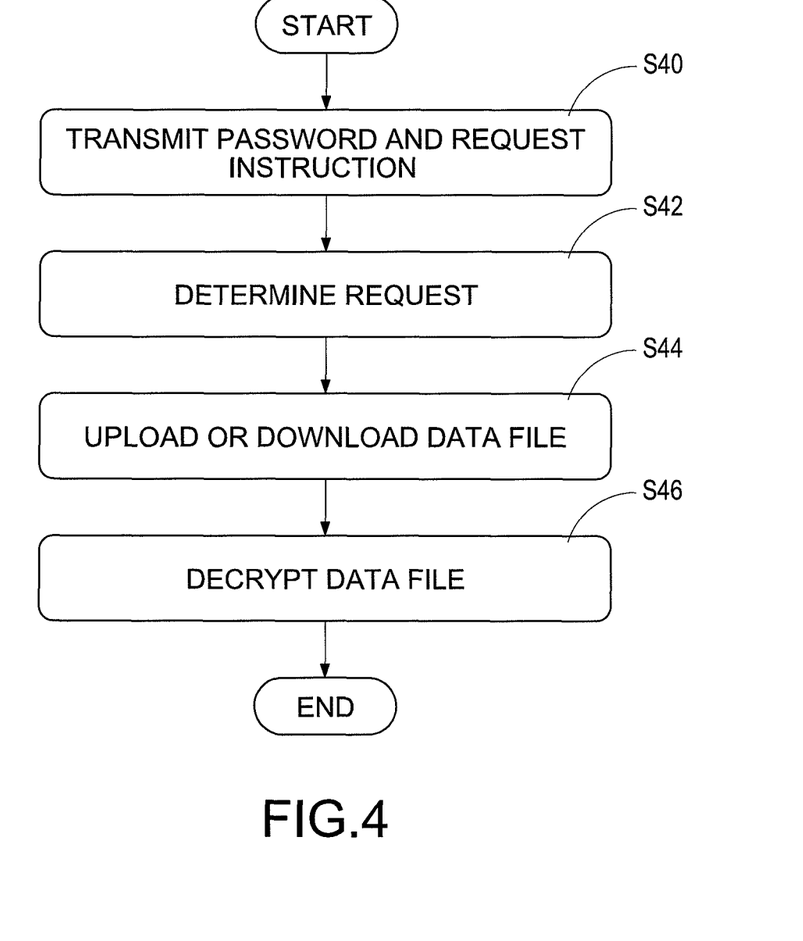
FIG. 4 is a flow chart illustrating file transmission according a preferred embodiment of the present invention.

FIG. 4 is a flow chart illustrating file transmission according a preferred embodiment of the present invention. The first step is transmitting a password file having a dynamic password to the HID 5 and issuing a request instruction via the data transmit application 41 installed in the computer 4' (step S40). Upon HID 5 receiving the password file successfully, corresponding data of the password file is not written to the FAT 54. Accordingly, the password file is not shown in the content of the storage device 5' on the computer 4' thus a third party cannot acknowledge, access or steal information in the password file and cannot access to the dynamic password. The dynamic password can be generated by computing information related to the computer 4' and the HID 5. For example, a dynamic password can be generated by the computer 4' with serial no of the HID 5 via a formula (for example a hashing function). The HID 5 generates the same dynamic password by the serial no of the HID 5 and the same formula to encrypt/decrypt upload/download files. The above is used as a preferred embodiment of the present invention and the scope of the invention should not be limited to the description. Following that, the HID 5 determines the request instruction from the computer 4' (step S42). In other words, the HID 5 determines the following action to download or upload a file.

Following the step S42, the computer 4' is enabled to transmit files via the application 41 to the HID 5 (step S44). If the request instruction is a file download request at the step S42, the HID 5 receives a download data file from the computer 4' and the download data file is encrypted by the dynamic password. Upon HID 5 receives the download data file successfully, the download data file is not written to the FAT 54. As a result, the download data file is not shown in the content of the storage device 5' on the computer 4'. If the request instruction is a file upload request at the step S42, a data corresponding to the upload data file and saved in the HID 5 is written to the FAT 54 by the HID 5 thus the upload data file is shown in the content of the storage device 5' on the computer 4'. Consequently, the upload data file is duplicated by the application 41 and transmitted to the computer 4'. The upload data file is encrypted by a dynamic password. The HID 5 deletes the upload data file from the upon the data file upload is completed thus a third party cannot duplicate the upload data file. Finally, upon the file transmission is completed, the HID 5 or the computer 4' decrypts the download or the upload file with the dynamic password, generated by the formula (step S46) and move on to the consequent operation as desired.

During the step S42 determining the request instruction, the file name of the password file can also be used for determining the instruction. For example, when the file name of the password file is assigned as "Download.dat" at step S40, the HID 5 is informed that the computer 4' requests to download a file via the application 41. On the other hand, when the file name of the password file is assigned as "Upload.dat", the HID 5 is informed that the computer 4' requests to upload a file. Yet, the above example is a preferred embodiment according to the present invention. It is known to people skilled in the art that the file naming is subject to the developer's wish and not subject to fix rules with the exception that certain special symbols are prohibited in naming a file. The scope of claims according to the present invention is not limited to scope of the preferred embodiment.

Figure 5:
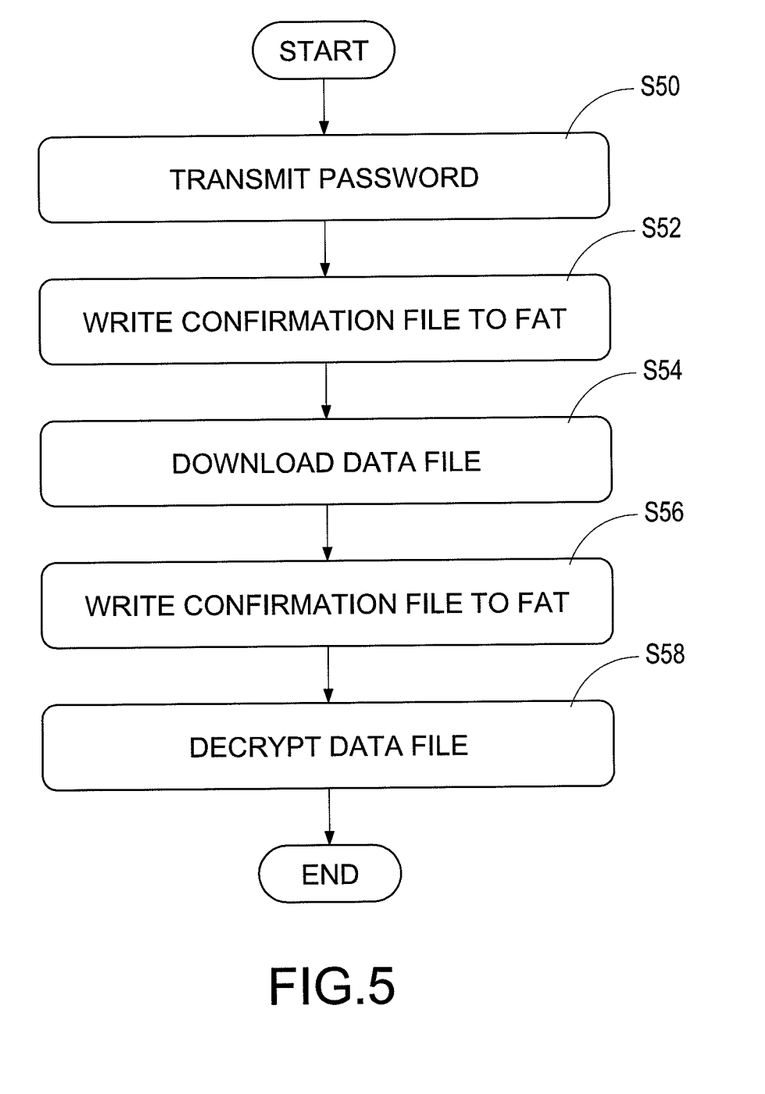
FIG. 5 is a flow chart illustrating file download according a preferred embodiment of the present invention.

The file process flow can be further detailed into flow chart for file download and file upload. FIG. 5 is a flow chart illustrating file download according a preferred embodiment of the present invention. Firstly, the computer 4' transmits a download password file having the dynamic password to the HID 5 via the application 41 installed (step S50). Upon HID 5 receiving the password file successfully, corresponding data of the password file is not written to the FAT 54. Therefore, the content of the storage device 5' on the computer 4' does not indicate whether the password file download succeeds or not and a third party does not have the access to the download password file. Following that, when the dynamic password in the download password file is determined correct, the HID 5 replies to the computer 4' indicating the download password file is received and is on waiting for proceeding to file download. In other words, a password confirmation file is written to the FAT 54 (step S52). In addition, the file name of the password confirmation file is assigned as "get.dat" or "wait.dat" serving as a reminder for following operations. Accordingly, when the password confirmation file is shown in the content of the storage device 5' on the computer 4', the computer 4' recognizes that the transmission of the download password file succeeded by identifying the password confirmation file via the application 41. Then the method proceeds to following steps of data transmission.

Following the step S52, the computer 4' transmits a download data file to the HID 5 via the application 41 (step S54). In order to prevent unauthorized duplication of the download data file, the HID 5 does not write the download data file to the FAT 54. The download data file is encrypted by the dynamic password by the computer 4'. Similar to the step S52, a data confirmation file is written to the FAT 54 upon successfully receiving the download data file (step S56). In addition, the file name of the data confirmation file is assigned as "down­.dat" or "ok.dat" serving as a reminder. The computer 4' identifies the data confirmation file in the content of the storage device 5' and recognizes that the transmission of the download data file is completed. Finally, the download data file is decrypted with the dynamic password in the download password file via the formula by the HID 5 (step S58). Then the method proceeds to following operations. In the above embodiment, the password confirmation file and the data confirmation file are used for replying to the computer 4' indicating that the HID 5 received the file successfully. The two confirmations files do not contain any other substantial messages or contents. Therefore, the data transmission is kept confidential given two confirmation files are written to the FAT 54.

Figure 6:
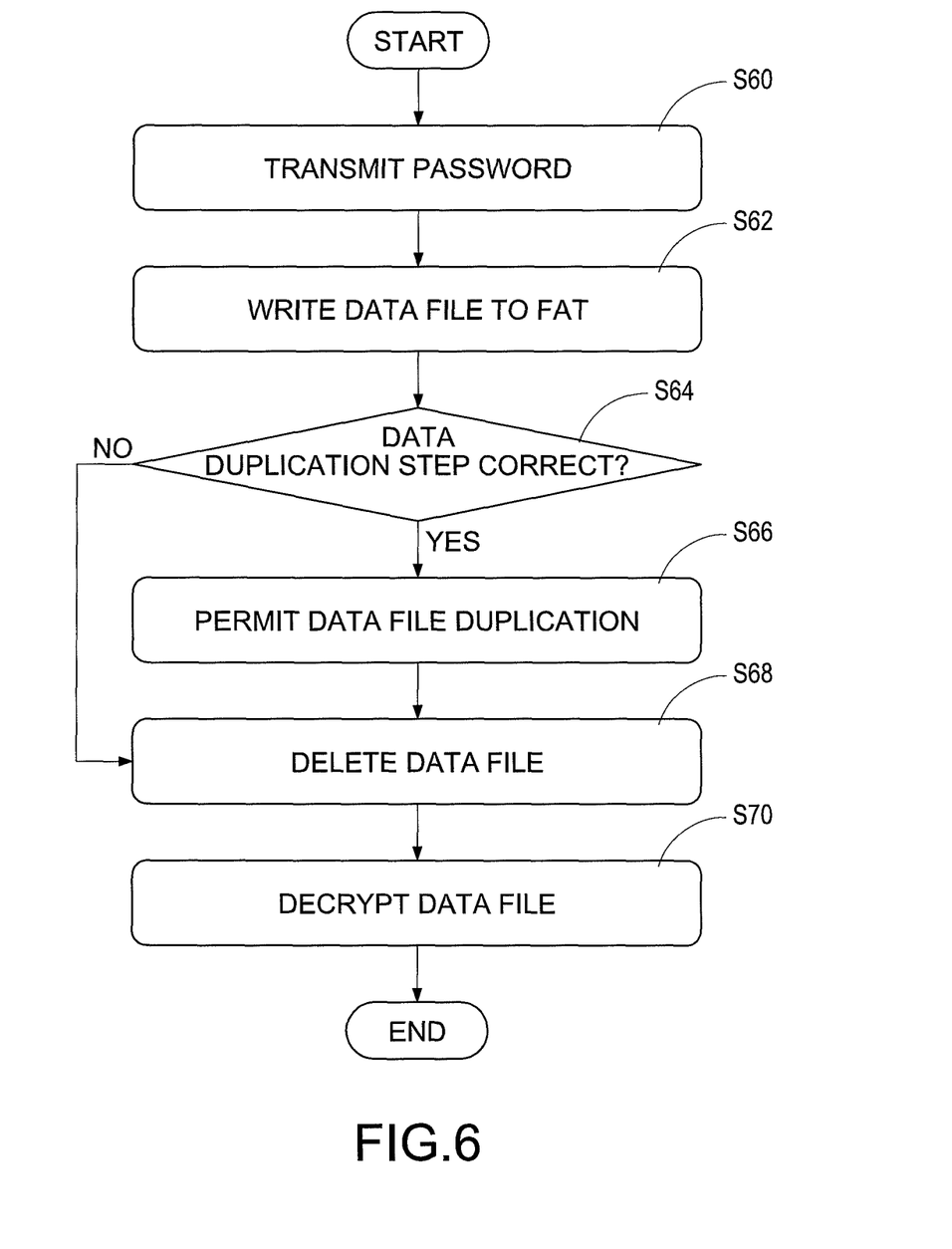
FIG. 6 is a flow chart illustrating file upload according a preferred embodiment of the present invention.

FIG. 6 is a flow chart illustrating file upload according a preferred embodiment of the present invention. Firstly, similar to the step S50 in FIG. 5, the computer 4' transmits an upload password file having the dynamic password via the application 41 installed to the HID 5 (step S60). Consequently, upon receiving the upload password file, the HID 5 confirms that the computer 4' requests to upload a file via the application 41. An upload data file which the computer 4' requests to access to is written to the FAT 54 by the HID 5 upon confirming the dynamic password in the upload password file is correct (step S62). The upload data file is encrypted with the dynamic password by the HID 5. Because the upload data file is saved in the HID 5 and not written to the FAT 54. The upload data file is not shown in the content of the storage device 5' on the computer 4'. The upload data file is shown in the content of the storage device 5' on the computer 4' when the step S62 is completed. Then step move to copy the upload data file via the application 41 to the computer 4'.

It should be noted that a mechanism preventing unauthorized data duplication can be launched by the application 41 working with the HID 5 during the duplication of the upload data file for determining whether the data duplication steps executed by the computer 4' are correct (step S64). If the data duplication steps are determined correct on computer 4', the HID 5 permits data duplication of the upload data file via the application 41 by the computer 4' (step S66). Also, the upload data file is deleted from the FAT 54 upon the data duplication is completed (step S68). If the data duplication steps are determined incorrect or not executed via the application 41 at the step S64, the data duplication of the upload data file is prohibited and proceeds to the step S68, which is deleting the upload data file from the FAT 54. Finally, the HID 5 decrypts the upload data file via the dynamic password in the upload password file with the formula (step S70) and proceeds to following operations.

Figure 7:
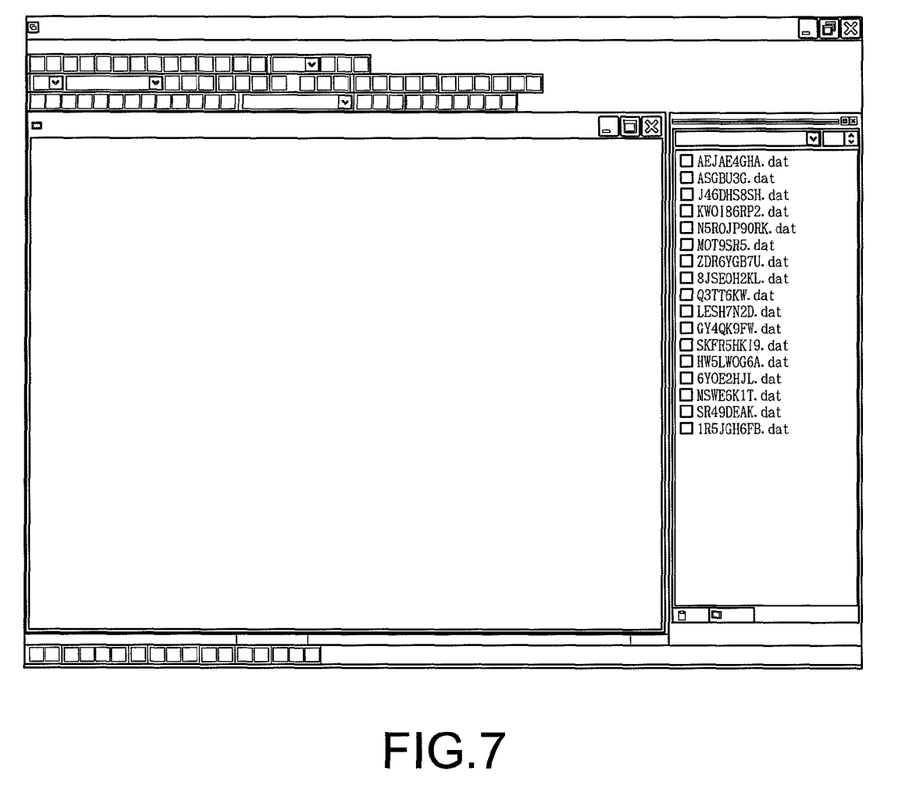
FIG. 7 is a flow chart illustrating a mechanism preventing unauthorized data duplication according a preferred embodiment of the present invention.

The above mentioned mechanism preventing unauthorized data duplication is detailed in the FIG. 7. FIG. 7 is a flow chart illustrating a mechanism preventing unauthorized data duplication according a preferred embodiment of the present invention. When the upload data file is written to the FAT 54 by the HID 5 and then shown in the content of the storage device 5', the upload data is encrypted by the dynamic password via the formula to generate a plurality of substitute files via a random generation formula. It follows that the file names of the a plurality of substitute file and the upload data file are modified to random file names such as "AEJAE4GHA.dat" and "1R5JGH6FB.dat" which do not indicate any information contained in the files as shown in FIG. 7. The computer 4' decrypts the random file names with the dynamic password via the formula to generate the correct file names of the upload data file when these files are shown in the content of the storage device 5'. As a result, when a data duplication request is made with an incorrect file name of a substitute file, the HID 5 recognizes the request as a data replication request by an unauthorized third party, and moves to delete all the files from the FAT 54 immediately. Such mechanism is used for preventing data access attempted by an unauthorized third party. The mechanism is effective given the third party offers the correct file names by accidently and succeeds in duplicating the file. Because the mechanism requires a decryption process on the random file name with the dynamic password via the formula computation, which proves that the mechanism provide a high security level on preventing unauthorized data duplication.

As the skilled person will appreciate, various changes and modifications can be made to the described embodiments. It is intended to include all such variations, modifications and equivalents which fall within the scope of the invention, as defined in the accompanying claims.

What is claimed is:

1. A method for transmitting data and preventing unauthorized data duplication for human-machine interface device (HID) using Mass Storage Class (MSC) operating on Universal Serial Bus (USB) simulating the HID as a USB storage device to transmit data to an external computer, the method comprising:

a) receiving a password file, wherein the password file has a file name, and the password file records a dynamic password therein;

b) determining a request of the external computer through the file name of the received password file by the HID as one of a file download request and a file upload request;

c) transmitting a data file according to the request, wherein when the request is determined as a file download request in the step b, the HID receives a download data file encrypted by the dynamic password transmitted from the external computer, when the request is determined as a file upload request in the step b, step c further comprising:

c1) writing an upload data file saved in the HID and encrypted by the dynamic password to the FAT by the HID thus the external computer is able to acknowledge existence of the upload data file;

c2) permitting a data duplication of the upload data file by the HID when a replication request of the upload data file is correct following step c1;

c3) when the data duplication of the upload data file executes once or the replication request of the upload data file is incorrect, deleting the upload data file from the FAT by the HID following step c2;

d) decrypting the data file via the dynamic password recorded in the password file following step c;

wherein the HID does not write the received password file to a File Allocation Table (FAT) thus the external computer is not able to acknowledge existence of the password file by accessing to the FAT.

2. The method for transmitting data and preventing unauthorized data duplication of claim 1, wherein the HID does not write the download data file to the FAT following receiving the download data file thus the external computer is not able to acknowledge the download data file by accessing to the FAT.

3. The method for transmitting data and preventing unauthorized data duplication of claim 1, wherein the step c1 further comprises steps:

c11) generating a random file name of the upload data file via a formula based on the dynamic password recorded in the password file;

c12) generating a plurality of substitute files via a formula based on the dynamic password recorded in the password file, wherein the a plurality of substitute files have random file names;

c13) writing the upload data file and the plurality of substitute files to the FAT.

4. The method for transmitting data and preventing unauthorized data duplication of claim 3, wherein when a data duplication of the plurality of substitute files is requested, the replication request is regarded as incorrect.

5. The method for transmitting data and preventing unauthorized data duplication of claim 3, wherein the formula is a hashing formula.

6. The method for transmitting data and preventing unauthorized data duplication of claim 1, wherein the HID is simulated as the USB storage device and allowed to transmit data files to the external computer by using a data transmit application developed by the HID developer.

7. A method for transmitting data and preventing unauthorized data duplication for human-machine interface device (HID) using Mass Storage Class (MSC) operating on Universal Serial Bus (USB) simulating the HID as a USB storage device to transmit data to an external computer, the method comprising:

- a) receiving a password file by the HID, wherein the password file has a file name, and the password file records a dynamic password therein;
- b) determining whether the password file is a download password file or an upload password file according to the file name of the received password file;
- c) when the password file is a download password file, writing a password confirmation file to a File Allocation Table (FAT) by the HID upon confirming a dynamic password in the download password file is correct;
- d) receiving a download data file encrypted by the dynamic password by the HID following step c;
- e) when the password file is a upload password file, generating a random file name of an upload data file via a formula based on the dynamic password recorded in the password file;
- f) generating a plurality of substitute files via a formula based on the dynamic password recorded in the password file, wherein the plurality of substitute files have random file names;
- g) writing the upload data file and the plurality of substitute files to the FAT by the HID, thus the external computer is able to acknowledge existence of the upload data file and the plurality of substitute files upon confirming the dynamic password in the upload password file is correct;
- h) permitting a data duplication of the upload data file by the HID when a replication request of the upload data file is correct following step g;
- i) when the data duplication of the upload data file executes once, or the replication request of the upload data file is incorrect, deleting the upload data file from the FAT by the HID following step h;

wherein the HID does not write the received password file and the download data file to the FAT thus an external computer is not able to acknowledge the download data file by accessing to the FAT.

8. The method for transmitting data and preventing unauthorized data duplication of claim 7, wherein the method further comprises a step j following the step d or the step h to decrypt the download data file or the upload data file via the dynamic password recorded in the password file.

9. The method for transmitting data and preventing unauthorized data duplication of claim 7, wherein the external computer transmits the download data file to the HID upon the password confirmation file written to the FAT at the step d.

10. The method for transmitting data, and preventing unauthorized data duplication of claim 9, further comprising a step k following the step d to write a data confirmation file to the FAT by the HID in respond to the message indicating the external computer received the download data file.

11. The method for transmitting data and preventing unauthorized data duplication of claim 7, wherein when a data duplication of the plurality of substitute files is requested, the replication request of the upload data file is regarded as incorrect.

12. The method for transmitting data and preventing unauthorized data duplication of claim 7, wherein the formula is a hashing formula.

13. The method for transmitting data and preventing unauthorized data duplication of claim 7, wherein the HID is simulated the USB storage device and is allowed to transmit data files to the external computer by using a data transmit application developed by the HID developer.

* * * * *